United States Patent
Yi et al.

(10) Patent No.: US 10,193,671 B2
(45) Date of Patent: Jan. 29, 2019

(54) SYSTEM AND METHOD FOR TRANSMISSION SYMBOL ARRANGEMENT FOR REDUCING MUTUAL INTERFERENCE

(71) Applicant: Huawei Technologies Co., Ltd., Shenzhen (CN)

(72) Inventors: Zhihang Yi, Ottawa (CA); Hosein Nikopour, Ottawa (CA); Mohammadhadi Baligh, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 102 days.

(21) Appl. No.: 14/535,038

(22) Filed: Nov. 6, 2014

(65) Prior Publication Data
US 2016/0134400 A1  May 12, 2016

(51) Int. Cl.
| | |
|---|---|
| *H04W 72/04* | (2009.01) |
| *H04L 5/00* | (2006.01) |
| *H04B 1/707* | (2011.01) |
| *H04J 13/16* | (2011.01) |

(52) U.S. Cl.
CPC .......... *H04L 5/0048* (2013.01); *H04B 1/707* (2013.01); *H04J 13/16* (2013.01); *H04L 5/0023* (2013.01)

(58) Field of Classification Search
CPC ........................... H04L 5/0048; H04W 72/082
USPC .................................................. 370/329, 208
See application file for complete search history.

(56) References Cited

U.S. PATENT DOCUMENTS

| | | | |
|---|---|---|---|
| 2006/0126491 A1* | 6/2006 | Ro | H04L 27/2647 370/208 |
| 2008/0253469 A1* | 10/2008 | Ma | H04B 7/0678 375/260 |
| 2009/0201902 A1 | 8/2009 | Miki et al. | |
| 2009/0219838 A1* | 9/2009 | Jia | H04B 7/0417 370/278 |
| 2010/0316148 A1 | 12/2010 | Lee et al. | |
| 2011/0280211 A1 | 11/2011 | Zhang et al. | |
| 2013/0266086 A1 | 10/2013 | Yang et al. | |
| 2014/0169408 A1 | 6/2014 | Bayesteh et al. | |
| 2014/0169409 A1 | 6/2014 | Ma et al. | |
| 2015/0071182 A1* | 3/2015 | Bayesteh | H04L 5/0042 370/329 |

FOREIGN PATENT DOCUMENTS

| | | |
|---|---|---|
| CN | 101471705 A | 7/2009 |
| JP | 2006287755 A | 10/2006 |

(Continued)

OTHER PUBLICATIONS

"3rd Generation Partnership Project; Technical Specification Group Radio Access Network; Evolved Universal Terrestrial Radio Access (E-UTRA); Physical channels and modulation (Release 12)," 3GPP TS 36.211 V12.3.0., Sep. 2014, 124 pages.

(Continued)

*Primary Examiner* — Robert M Morlan
*Assistant Examiner* — Pamit Kaur
(74) *Attorney, Agent, or Firm* — Slater Matsil, LLP (57) ABSTRACT

A method for operating a first device includes determining a spreading pattern associated with the first device, placing a pilot signal associated with the first device into resources of a first transmission symbol in accordance with the spreading pattern, and transmitting the first transmission symbol to a second device.

19 Claims, 10 Drawing Sheets

(56) References Cited

FOREIGN PATENT DOCUMENTS

| | | |
|---|---|---|
| JP | 2009017341 A | 1/2009 |
| JP | 2010504716 A | 2/2010 |
| JP | 2012147464 A | 8/2012 |
| WO | 2014090189 A1 | 6/2014 |

OTHER PUBLICATIONS

A. Bayesteh et al.,"Blind Detection of SCMA for Uplink Grant-Free Multiple-Access", 2014, 6 pages, 11th International Symposium on Wireless Communications Systems (ISWCS). Ottawa, Ontario, Canada.

\* cited by examiner

SYSTEM AND METHOD FOR TRANSMISSION SYMBOL ARRANGEMENT FOR REDUCING MUTUAL INTERFERENCE

TECHNICAL FIELD

The present disclosure relates generally to digital communications, and more particularly to a system and method for transmission symbol arrangement for reducing mutual interference.

BACKGROUND

In general, a pilot signal or a reference signal is transmitted by a transmitting device, such as an evolved NodeB (eNB) and/or a user equipment (UE), to help a receiving device in decoding the transmission by assisting in channel estimation. However, if two or more transmitting devices simultaneously transmit their pilot signals on the same network resources, mutual interference occurs and channel estimation performance decreases. Hence, overall communications system performance degrades.

SUMMARY OF THE DISCLOSURE

Example embodiments of the present disclosure which provide a system and method for transmission symbol arrangement for reducing mutual interference.

In accordance with an example embodiment of the present disclosure, a method for operating a transmitting device is provided. The method includes determining, by the transmitting device, a spreading pattern associated with the transmitting device, and placing, by the transmitting device, a pilot signal associated with the transmitting device into resources of a first transmission symbol in accordance with the spreading pattern. The method also includes transmitting, by the transmitting device, the first transmission symbol to a receiving device.

In accordance with another example embodiment of the present disclosure, a method for operating a receiving device is provided. The method includes determining, by the receiving device, a spreading pattern associated with a transmitting device, and receiving, by the receiving device, a first transmission symbol from the transmitting device. The method also includes detecting, by the receiving device, a pilot signal associated with the transmitting device in resources of the first transmission symbol in accordance with the spreading pattern.

In accordance with another example embodiment of the present disclosure, a transmitting device is provided. The transmitting device includes a processor, and a transmitter operatively coupled to the processor. The processor determines a spreading pattern associated with the transmitting device, and places a pilot signal associated with the transmitting device into resources of a first transmission symbol in accordance with the spreading pattern. The transmitter transmits the first transmission symbol to a receiving device.

In accordance with another example embodiment of the present disclosure, a receiving device is provided. The receiving device includes a processor, and a receiver operatively coupled to the processor. The processor determines a spreading pattern associated with a transmitting device, and detects a pilot signal associated with the transmitting device in resources of a first transmission symbol in accordance with the spreading pattern. The receiver receives the first transmission symbol from the transmitting device.

One advantage of an embodiment is that more simultaneous UE transmissions are supported without suffering decreased channel estimation performance.

A further advantage of an embodiment is that with the increased number of simultaneous UE transmissions, UEs can transmit more frequently in general.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to transmission symbol arrangement for reducing mutual interference. For example, a transmitting device determines a spreading pattern associated with the transmitting device, places a pilot signal associated with the transmitting device into resources of a first transmission symbol in accordance with the spreading pattern, and transmits the first transmission symbol to a receiving device.

The present disclosure will be described with respect to example embodiments in a specific context, namely sparse code multiple access (SCMA) and/or low density signature (LDS) communications systems that use pilot signals to help improve channel estimation performance. The disclosure may be applied to standards compliant communications systems, and non-standards compliant communications systems, that use SCMA and/or LDS.

Figure 1:
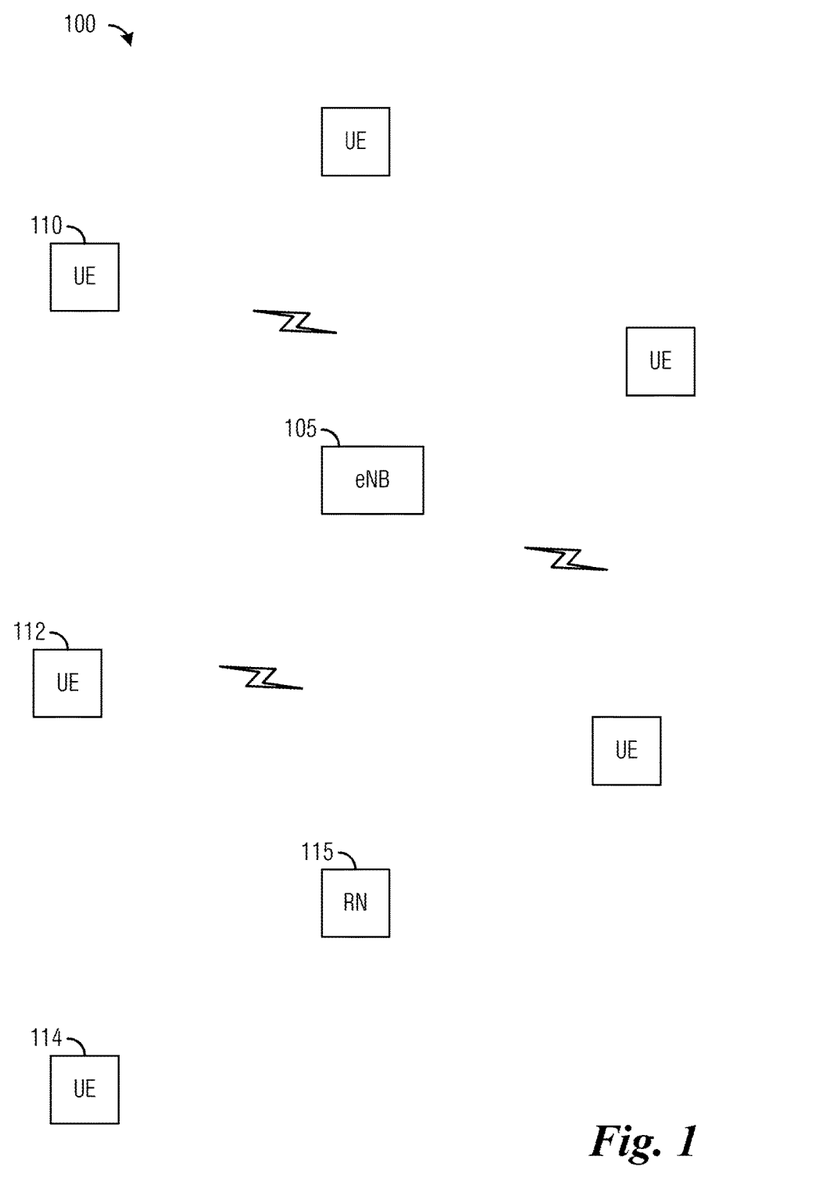
FIG. 1 illustrates an example communications system according to example embodiments described herein.

FIG. 1 illustrates an example communications system 100. Communications system 100 includes an eNB 105 serving a plurality of UEs, such as UE 110, UE 112, and UE 114. In general, communications to and from a UE pass through eNB 105. However, in a machine-to-machine (M2M) mode, UEs may be able to communicate directly without going through eNB 105. Communications system 100 may also include a relay node (RN) 115. RN 115 may use network resources of eNB 105 to help improve coverage and overall performance. As shown in FIG. 1, RN 115 may serve UE 114 to help improve coverage for UE 114. Furthermore, eNB 105 and RN 115 may simultaneously transmit to UE 114 to further improve overall performance.

It is noted that an eNB may also be commonly referred to as a base station, NodeB, controller, communications controller, and the like. Similarly, a UE may also be commonly referred to as a mobile station, mobile, user, subscriber, terminal, and the like.

While it is understood that communications systems may employ multiple eNBs capable of communicating with a number of RNs and UEs, only one eNB, and a number of RNs and UEs are illustrated for simplicity.

Figure 2:
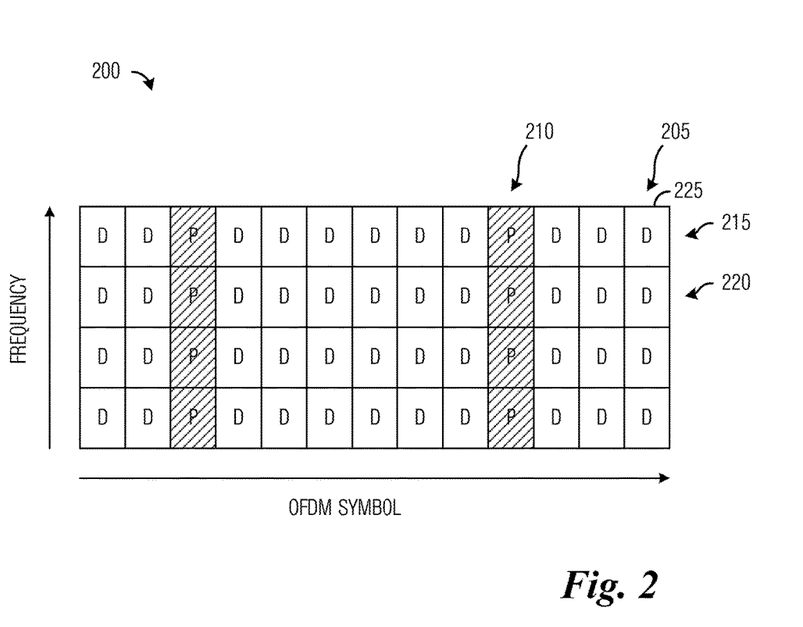
FIG. 2 illustrates an example orthogonal frequency division multiplexed (OFDM) symbols in a Third Generation Partnership Project (3GPP) Long Term Evolution (LTE) compliant communications system.

FIG. 2 illustrates a diagram of example orthogonal frequency division multiplexed (OFDM) symbols 200 in a Third Generation Partnership Project (3GPP) Long Term Evolution (LTE) compliant communications system. An OFDM symbol is an example of a transmission symbol. In general, OFDM symbols, such as OFDM symbols 200 includes a plurality of network resources and may include time resources, frequency resource, or a combination of time and frequency resources (individual blocks in FIG. 2 represent a time-frequency resource of orthogonal frequency division multiple access (OFDMA), also commonly referred to as a tone). Time resources may be referred to as time slots and frequency resources may be referred to as tones. As an example, OFDM symbols 200 include a time slot 205 and a time slot 210 and tone 215 and tone 220. An individual network resource may be referred to by a combination of its time resource and frequency resource. As an example, network resource 225 may be referred to as tone 215 of time slot 205.

Network resources of OFDM symbols 200 may contain data (shown as network resources labeled "D"), pilot signals (shown as network resources labeled "P"), control signals, or a combination thereof. In a 3GPP LTE compliant communications system, pilot signals are transmitted in specified time slots, such as time slot 210, to help a receiving device perform channel estimation. Multiple transmitting devices may transmit their pilot signals in the same time slot. Accurate channel estimation may be necessary to have good data detection performance.

Code division multiplexing (CDM) is used in the transmission of pilot signals to support the transmission of pilot signals by the plurality of transmitting devices. CDM is sufficient to achieve good channel estimation performance when the number of transmitting devices is low. However, when the number of transmitting is large, mutual interference may become a significant problem and poor channel estimation performance results. Therefore, there is a need for a system and method for transmission symbol arrangement for reducing mutual interference.

In a sparse code multiple access (SCMA) or a low density signature (LDS) communications system, data is spread in accordance with a SCMA codeword, or a LDS spreading signature, respectively. Each SCMA codeword or LDS spreading signature comprises a sequence of values, generally presented as zero and non-zero values. Collectively, the zero and non-zero pattern of SCMA codewords and/or LDS spreading signatures may be referred to as spreading patterns. SCMA and LDS are used for multiplexing different layers of data. LDS uses repetitions of the same symbol on layer-specific nonzero position in time or frequency. As an example, in LDS-OFDM a constellation point is repeated (with some possible phase rotations) over nonzero frequency tones of a LDS block. SCMA is a generalization of LDS where a multidimensional codebook is used to spread data over tones without necessarily repeating symbols.

SCMA is a modulation technique that encodes data streams, such as binary data streams into multidimensional codewords selected from SCMA codebooks. SCMA directly encodes the data stream into multidimensional codewords and circumvents quadrature amplitude modulation (QAM) bits to symbol mapping, which may lead to coding gain over conventional QAM modulation and LDS spreading. Notably, SCMA encoding techniques convey data streams using a multidimensional codeword rather than a QAM symbol.

Additionally, SCMA encoding provides multiple access through the use of different codebooks for different multiplexed layers, as opposed to the use of different spreading sequences (or signatures) for difference multiplexed layers, e.g., a LDS signatures in LDS, as is common in conventional CDMA encoding. Furthermore, SCMA encoding typically uses codebooks with sparse codewords that enable receivers to use low complexity algorithms, such as message passing algorithms (MPA), to detect respective codewords from combined codewords received by the receiver, thereby reducing processing complexity in the receivers.

Figure 3A:
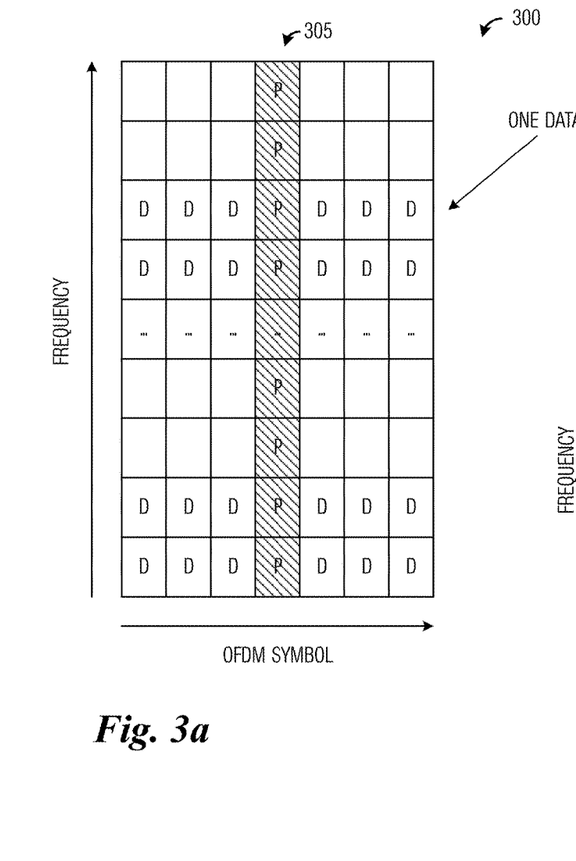
FIG. 3a illustrates an example OFDM symbols with pilot signals fully occupying a single time slot according to example embodiments described herein.

FIG. 3a illustrates example OFDM symbols 300 with pilot signals fully occupying a single time slot. OFDM symbols 300 may be an example of OFDM symbols transmitted in a SCMA or LDS communications system. Pilot signals transmitted by transmitting devices fully occupy a time slot 305, while data transmitted by the transmitting devices are spread in accordance with a spreading pattern, such as a low density signature in a LDS communications system or a sparse codeword in a SCMA communications system. FIG. 3a illustrates data transmitted by a transmitting device with spreading pattern 0 0 1 1. It is noted that data transmitted by other transmitting devices are not shown in FIG. 3a to maintain clarity.

Figure 3B:
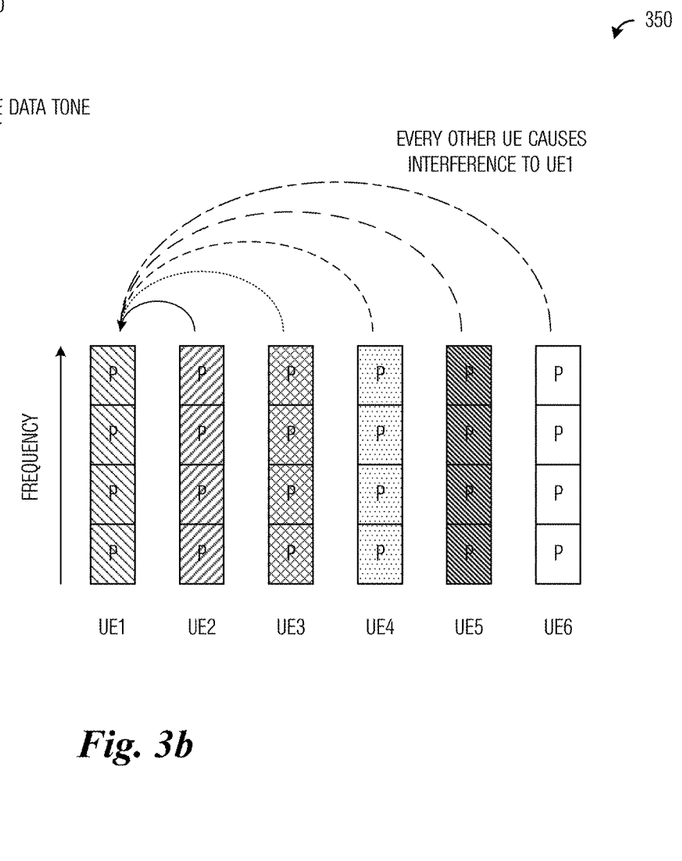
FIG. 3b illustrates example time slots containing pilot signals transmitted by a plurality of transmitting devices according to example embodiments described herein.

FIG. 3b illustrates example time slots 350 containing pilot signals transmitted by a plurality of transmitting devices. It is noted that the pilot signals may be transmitted by the transmitting device that are representative of Third Generation Partnership Project (3GPP) Long Term Evolution (LTE) compliant transmitting devices. Since the pilot signals transmitted by the plurality of transmitting devices fully occupy the tones, there is significant mutual interference. As shown in FIG. 3b, the pilot signals transmitted by UEs 2-6 (UE2, UE3, UE4, UE5, and UE6) induce interference to UE1.

Since the pilot signals transmitted by each of the plurality of transmitting devices collide with every other transmitting device and suffer heavy mutual interference, a large number of active transmitting devices typically cannot be supported. Furthermore, transmission power is supported on tones which are not needed to estimate the channels corresponding to the tones. As an illustrative example, referring back to FIG. 3a, to help ensure good performance, only the channels corresponding to tones labeled "D" need to be estimated. However, in LTE, the pilot signals are transmitted in all of the tones.

According to an example embodiment, it may be possible to exploit sparsity in the frequency domain present in a SCMA or LDS communications system. The data transmitted of a transmitting device may be spread using a spreading pattern associated with the transmitting device.

Figure 4:
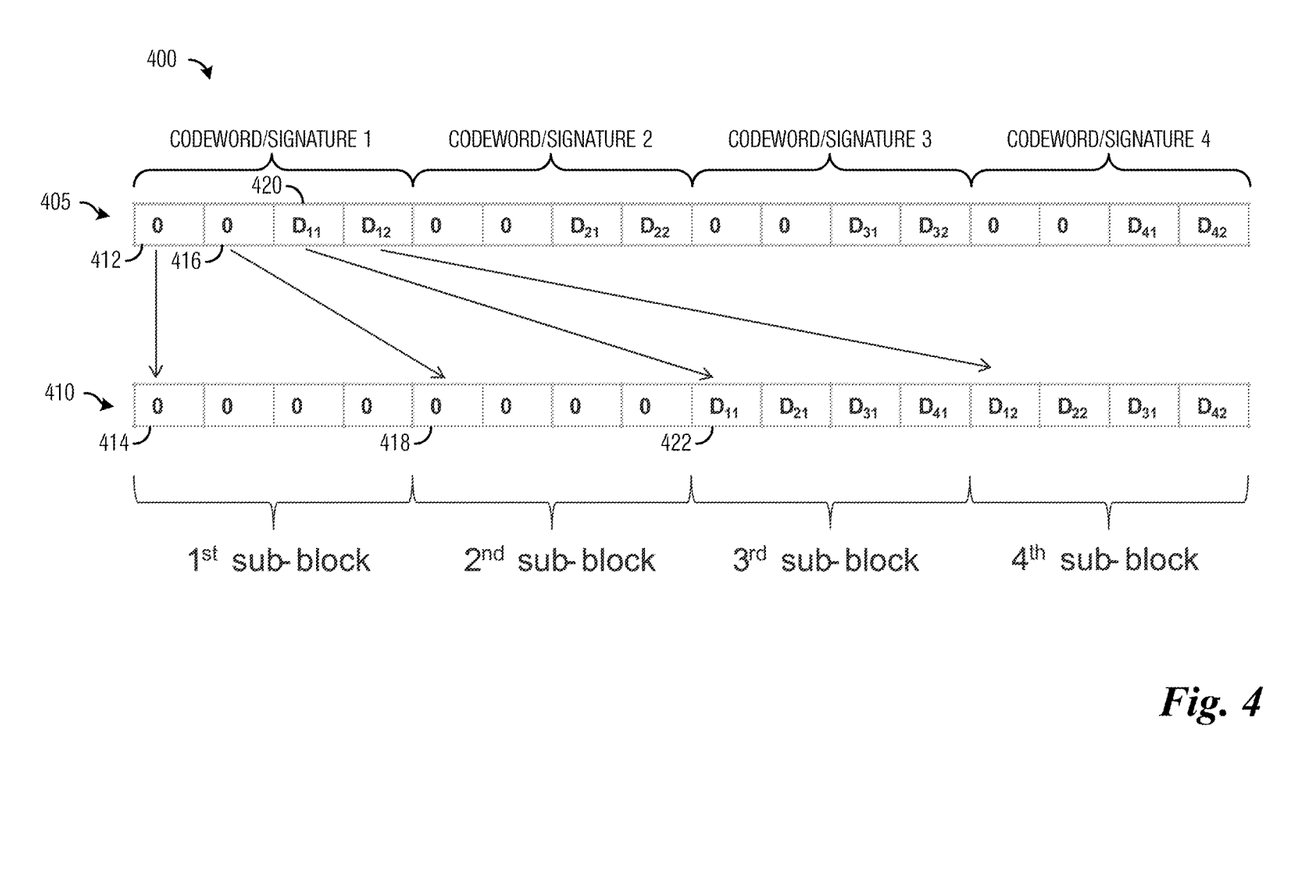
FIG. 4 illustrates a diagram of sequences highlighting an example data arrangement technique according to example embodiments described herein.

FIG. 4 illustrates a diagram of sequences 400 highlighting an example data arrangement technique. Sequences 400 include a first data stream 405 illustrates data after being spread by spreading pattern 0 0 1 1. It is noted that the use of different spreading patterns will result in different sequences. A second data stream 410 illustrates the data after arrangement with the data arrangement technique.

According to an example embodiment, the data arrangement corresponds to the spreading pattern associated with the transmitting device. As an illustrative example, consider the following scenario: a time slot with a total of 16 tones, and a spreading pattern of 0 0 1 1. Therefore, the total number of tones is divided into L sub-blocks, where L is the length of the spreading pattern (e.g., SCMA codeword or LDS spreading signature), in FIG. 4, L=4. Let the data stream contain C spreading patterns (e.g., SCMA codewords or LDS spreading signatures), in FIG. 4, C=4. The total length of the data stream is C×L tones. As shown in FIG. 4, C×L=16 tones. The number of sub-blocks in the data after arrangement is L, where each sub-block contains C tones. Hence, there are L=4 sub-blocks with C=4 tones in each sub-block. The example data arrangement technique may be expressed as:

The I-th element of the k-th spreading pattern, e.g., SCMA codeword or LDS sequence, of a first data stream is placed in the k-th tone of the I-th sub-block of a second data stream, where the second data stream is the first data stream after application of the data arrangement.

As an illustrative example, consider tone 412 that is the first element of the first spreading pattern (e.g., SCMA codeword or LDS sequence). Tone 412 is placed in the first tone of the first sub-block (shown as tone 414) in accordance with the example data arrangement technique. Similarly, tone 416 is the second element of the first spreading pattern. Tone 416 is placed in the first tone of the second sub-block (shown as tone 418) in accordance with the example data arrangement technique. Also, tone 420 is the third element of the first spreading pattern. Tone 420 is placed in the first tone of the third sub-block (shown as tone 422). Remaining tones of spreading patterns of first data stream 405 may be placed in a similar manner. It is noted that the example data arrangement technique shown is for illustrative purposes only and that variations in the arrangement are possible. Therefore the discussion should not be construed as being limiting to either the scope or the spirit of the example embodiments.

According to an example embodiment, it may be possible to further exploit sparsity in the frequency domain present in a SCMA or LDS communications system. The pilot signals of a particular transmitting device may be transmitted according to a spreading pattern (e.g., SCMA codebook or LDS spreading signature) associated with the transmitting device. In other words, the pilot signals are transmitted at the same tones as the data transmitted by the transmitting device.

Figure 5A:
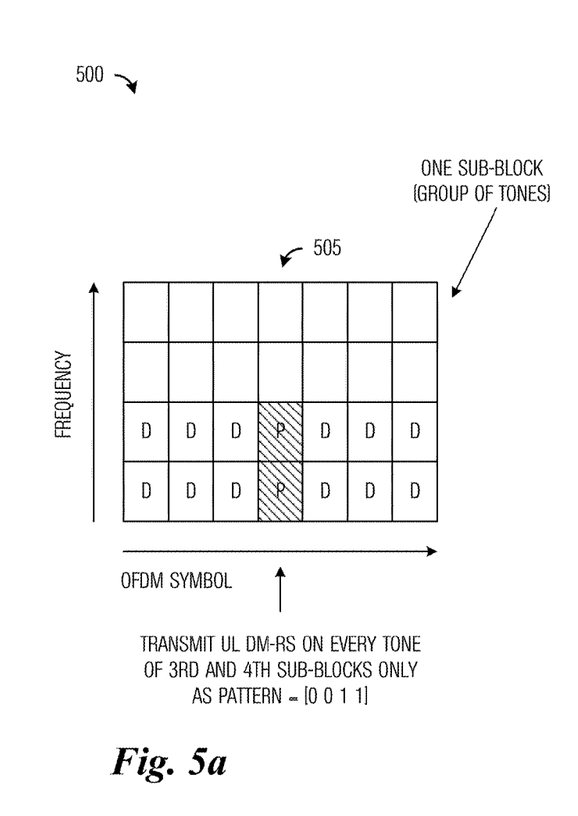
FIG. 5a illustrates example OFDM symbols with pilot signals of a transmitting device placed in tones in accordance with a spreading pattern associated with the transmitting device according to example embodiments described herein.

FIG. 5a illustrates example OFDM symbols 500 with pilot signals of a transmitting device placed in tones in accordance with a spreading pattern associated with the transmitting device. OFDM symbols 500 may be an example of OFDM symbols transmitted in a SCMA or LDS communications system. Pilot signals transmitted by transmitting devices are placed in tones of a time slot in accordance with spreading patterns (e.g., SCMA codebook or LDS spreading signatures) associated with the transmitting devices. As an illustrative example, OFDM symbols 500 includes pilot signals placed in sub-blocks 3 and 4 of time slot 505 with sub-blocks being numbered starting at 1 at the top of a time slot, corresponding to spreading pattern 0 0 1 1. It is noted that each of the sub-blocks corresponds to a group of contiguous tones.

Figure 5B:
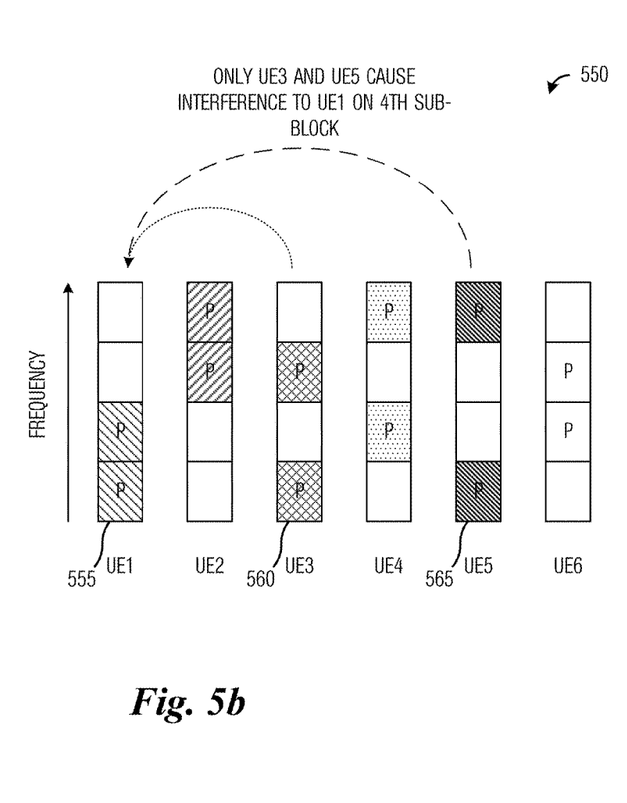
FIG. 5b illustrates example time slots containing pilot signals transmitted by a plurality of transmitting devices with the pilot signals placed in tones in accordance with spreading patterns associated with the plurality of transmitting devices according to example embodiments described herein.

FIG. 5b illustrates example time slots 550 containing pilot signals transmitted by a plurality of transmitting devices with the pilot signals placed in tones in accordance with spreading pattern associated with the plurality of transmitting devices. Since the pilot signals transmitted by the plurality of transmitting devices occupy tones in accordance with the spreading patterns associated with the plurality of transmitting devices, mutual interference is reduced. As an illustrative example, consider sub-block 555 that includes pilot signals transmitted by UE1. It is noted that only sub-blocks 560 and 565 are also occupied by pilot signals transmitted by UE3 and UE5. Therefore, only UE1, UE3, and UE5 suffer mutual interference in the tone that corresponds to sub-blocks 555, 560, and 565.

According to an example embodiment, it may not be necessary to estimate the channel corresponding to a tone where no data is being transmitted since, for a particular transmitting device, pilot signals are transmitted only on sub-blocks corresponding to tones that are also used to transmit data transmitted by the transmitting device. Hence, the transmit power level of the pilot tones may be increased. The increased transmit power level may result in better channel estimation performance as well as overall communications performance.

Frequency diversity may be achieved when a transmission is made in multiple frequency bands, e.g., tones, to improve the reliability of the delivery of the transmission. Frequency diversity is typically used to combat fading, interference, and the like. In general, frequency diversity uses a wider frequency bandwidth range to perform the transmission.

According to an example embodiment, the arrangement of the pilot signals and/or the data may be performed in a different manner to exploit frequency diversity. As an example, it may be possible to partition the available bandwidth of an OFDM symbol into multiple blocks and within each block, place the pilot signals and/or data in accordance with spreading patterns.

Figure 6A:
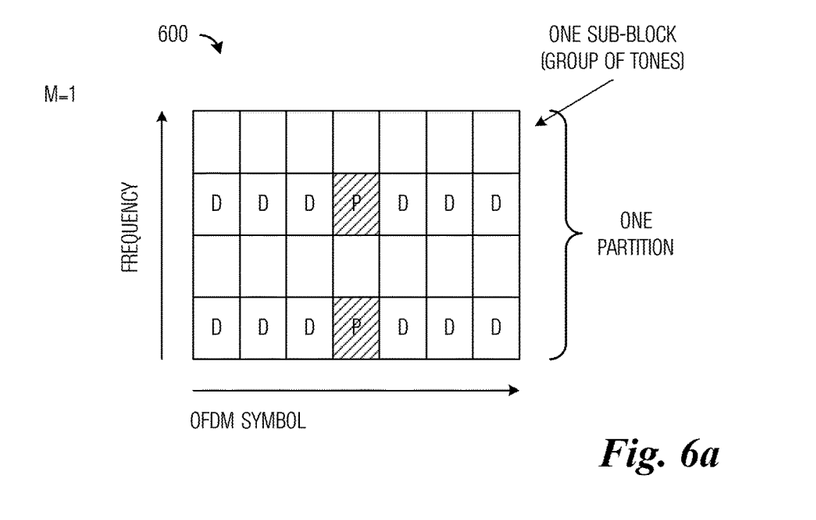
FIG. 6a illustrates example OFDM symbols with a single partition according to example embodiments described herein.

FIG. 6a illustrates example OFDM symbols 600 with a single partition. As shown in FIG. 6a, the data and pilot signals are transmitted according to spreading pattern 0 1 0

1. The bandwidth of OFDM symbols 600 may be partitioned into M=1 partitions. M may also be referred to as a diversity factor. In general, as M increases, the frequency diversity also increases. Pilot signals and/or data of transmissions made by transmitting devices may be placed in each partition of OFDM symbols 600 in accordance with spreading patterns associated with the transmitting devices. Since M=1, frequency diversity may not be achieved for all spreading patterns.

Figure 6B:
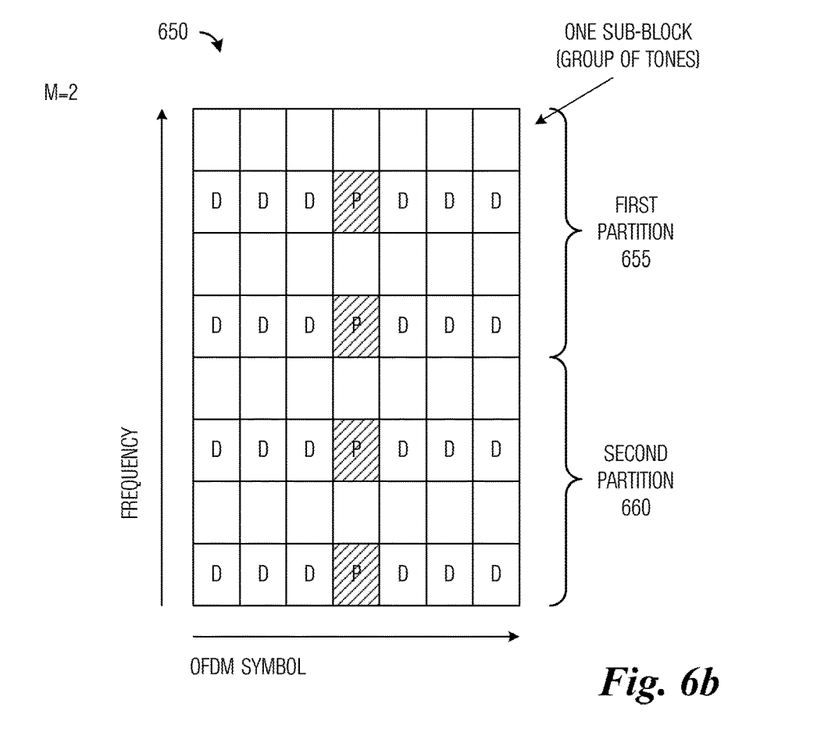
FIG. 6b illustrates example OFDM symbols with two partitions according to example embodiments described herein.

FIG. 6b illustrates example OFDM symbols 650 with two partitions. As shown in FIG. 6b, the data and pilot signals are transmitted according to spreading pattern 0 1 0 1. The bandwidth of OFDM symbols 650 may be partitioned into M=2 partitions, a first partition 655 and a second partition 660. Pilot signals and/or data of transmissions made by transmitting devices may be placed in each partition of OFDM symbols 650 in accordance with spreading patterns associated with the transmitting devices. Therefore, the pilot signals and/or data of transmissions may occur in each of the two partitions. The same arrangement technique may be used to place pilot signals and/or data in each partition or different arrangement techniques may be used for each partition. An optimum value for M (the number of partitions) may be determined for a variety of situations and stored at transmitting devices and receiving devices and may be selected depending on situation. Although the discussion illustrates the bandwidth of OFDM symbols being partitioned into 1 or 2 partitions, the example embodiments presented herein are operable for any number of partitions. Therefore, the discussion of 1 and 2 partitions should not be construed as being limiting to either the scope or spirit of the example embodiments.

An example data arrangement technique is as follows:
   a. Evenly partition the bandwidth of an OFDM symbol into M partitions;
   b. Within each partition, divide the partition into L (the length of a spreading pattern) sub-blocks;
   c. Starting with the first partition, put data (or pilot signals) into each partition by
      i. let $x_k$ denote the k-th spreading pattern of the partition;
      ii. after spreading, $x_k$ is denoted by a vector of length L;
      iii. place the I-th (I=[1, . . . ,L]) element in the vector in the k-th tone of the I sub-block in the partition; and
      iv. when the partition is filled, go to the next block and set k=1.

A variation of the data arrangement technique may involve the transmitting device looping through the partitions instead of filling each partition completely prior to moving to the next partition.

Figure 7:
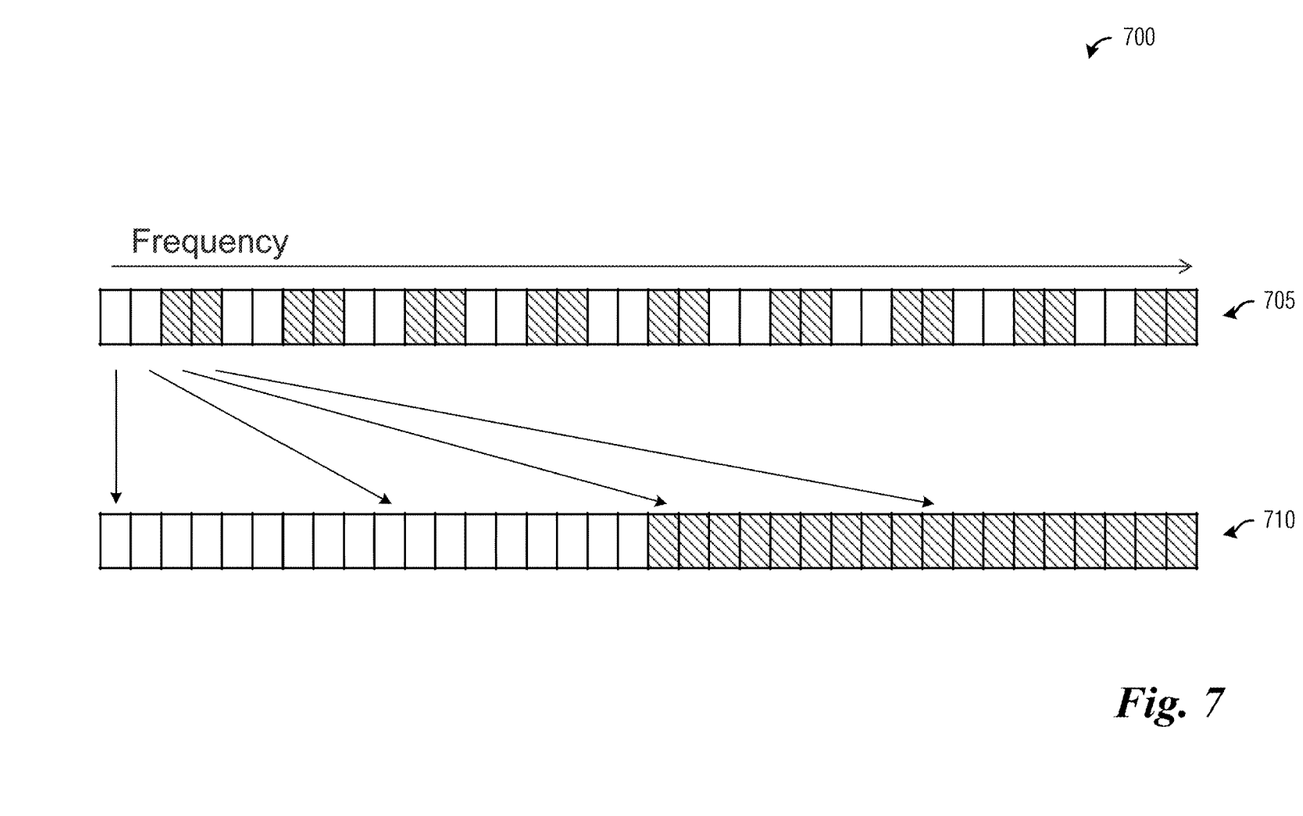
FIG. 7 illustrates a diagram of sequences highlighting an example data arrangement technique for a downlink transmission according to example embodiments described herein.

The example embodiments discussed herein may be used in uplink transmissions and/or downlink transmissions. As an illustrative example, consider a situation where UE1 is a cell-edge UE with spreading pattern 0 0 1 1. FIG. 7 illustrates a diagram of stream 700 highlighting an example data arrangement technique for a downlink transmission. A first sequence 705 illustrates data after being spread by the spreading pattern 0 0 1 1. It is noted that the use of different spreading patterns will result in different sequences. A second sequence 710 illustrates the data after arrangement with the data arrangement technique.

Figure 8:
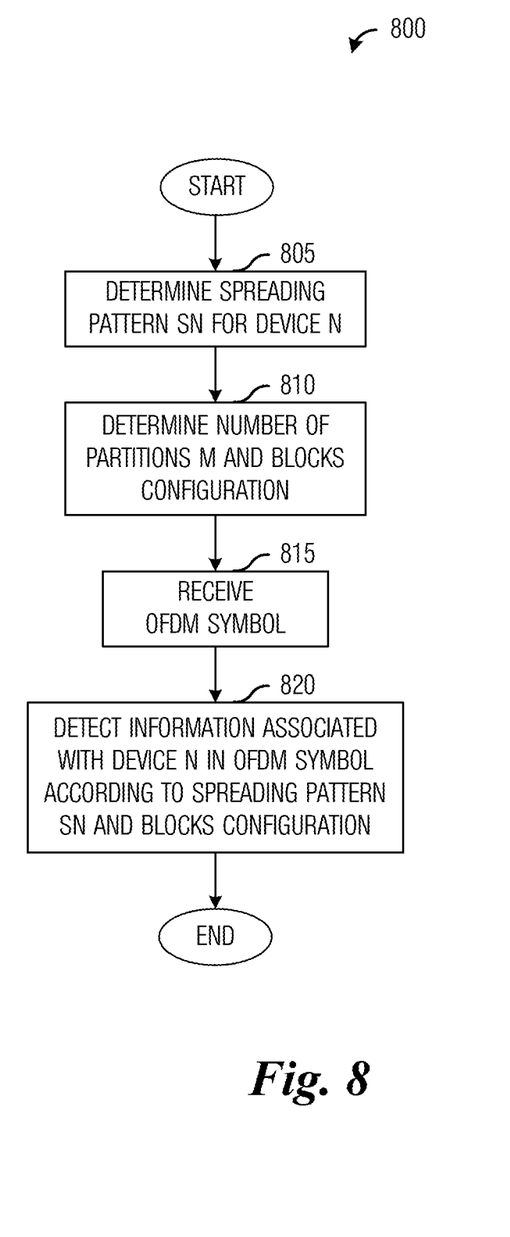
FIG. 8 illustrates a flow diagram of example operations occurring in a receiving device as the receiving device receives OFDM symbols with pilot signals and/or data arranged in accordance with spreading patterns of transmitting devices according to example embodiments described herein.

FIG. 8 illustrates a flow diagram of example operations 800 occurring in a receiving device as the receiving device receives OFDM symbols with pilot signals and/or data arranged in accordance with spreading patterns of transmitting devices. Operations 800 may be indicative of operations occurring in a receiving device, such as an eNB in an uplink transmission or a UE in a downlink transmission, as the receiving device receives OFDM symbols with pilot signals and/or data arranged in accordance with spreading patterns of transmitting devices.

Operations 800 may begin with the receiving device determining a spreading pattern SN for transmitting device N (block 805). The spreading pattern SN may be assigned to transmitting device N when it initially powered on or attached with a communications system including the receiving device. The receiving device may determine a number of partitions M and a blocks configuration for the partitions (block 810). The receiving device may determine the number of partitions M to optimize frequency diversity, as well as capability of the communicating devices (the transmitting device and the receiving device). The value of M may be pre-determined for a variety of situations and stored in the receiving device. The blocks configuration may specify how the bandwidth available is divided and the specific frequency ranges, tones, sub-blocks, and the like, belonging to each partition.

The receiving device may receive an OFDM symbol (block 815). The receiving device may detect information associated with the transmitting device in accordance to the spreading pattern SN and the blocks configuration (block 820). As an example, the receiving device may determine the location of the pilot signals of the transmitting device and the receiving device may detect the pilot signals at the locations and use the pilot signals for channel estimation. The channel estimates may be used by the receiving device to detect data transmitted by the transmitting device.

Figure 9:
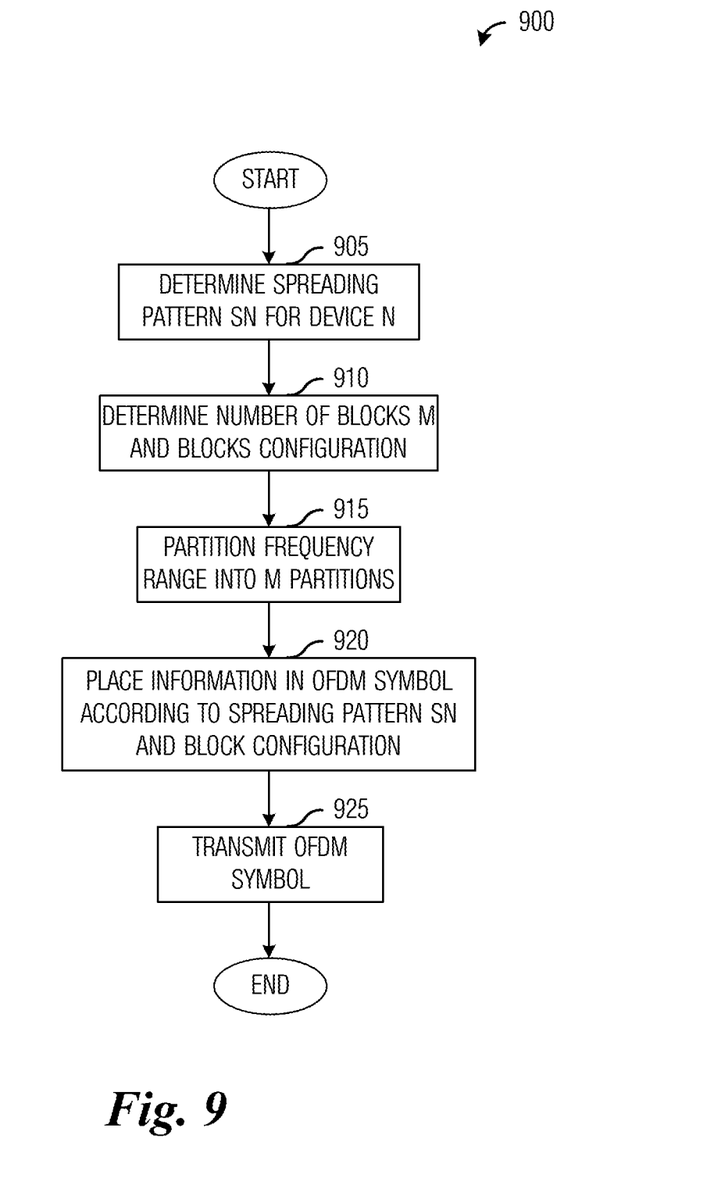
FIG. 9 illustrates a flow diagram of example operations occurring in a transmitting device as the transmitting device transmits OFDM symbols with pilot signals and/or data arranged in accordance with spreading patterns of transmitting device according to example embodiments described herein.

FIG. 9 illustrates a flow diagram of example operations 900 occurring in a transmitting device as the transmitting device transmits OFDM symbols with pilot signals and/or data arranged in accordance with spreading patterns of transmitting device. Operations 900 may be indicative of operations occurring in a transmitting device, such as an eNB in a downlink transmission or a UE in an uplink transmission, as the transmitting device transmits OFDM symbols with pilot signals and/or data arranged in accordance with spreading pattern of transmitting device.

Operations 900 may begin with the transmitting device determining a spreading pattern SN for transmitting device N (block 905). The spreading pattern SN may be assigned to transmitting device N when it initially powered on or attached with a communications system including the receiving device. The transmitting device may determine a number of partitions M and a blocks configuration for the partitions (block 910). The transmitting device may determine the number of partitions M to optimize frequency diversity, as well as capability of the communicating devices (the transmitting device and the receiving device). The value of M may be pre-determined for a variety of situations and stored in the transmitting device. The blocks configuration may specify how the bandwidth available is divided and the specific frequency ranges, tones, sub-blocks, and the like, belonging to each partition. The transmitting device may partition the frequency range of the OFDM symbols into M partitions (block 915).

The transmitting device may place information (pilot signals and/or data) in the OFDM symbol in accordance with the spreading pattern SN (block 920). The transmitting device may utilize a data arrangement technique such as those disclosed herein to place the information in the OFDM symbol. The transmitting device may transmit the OFDM symbol (block 925).

Figure 10:
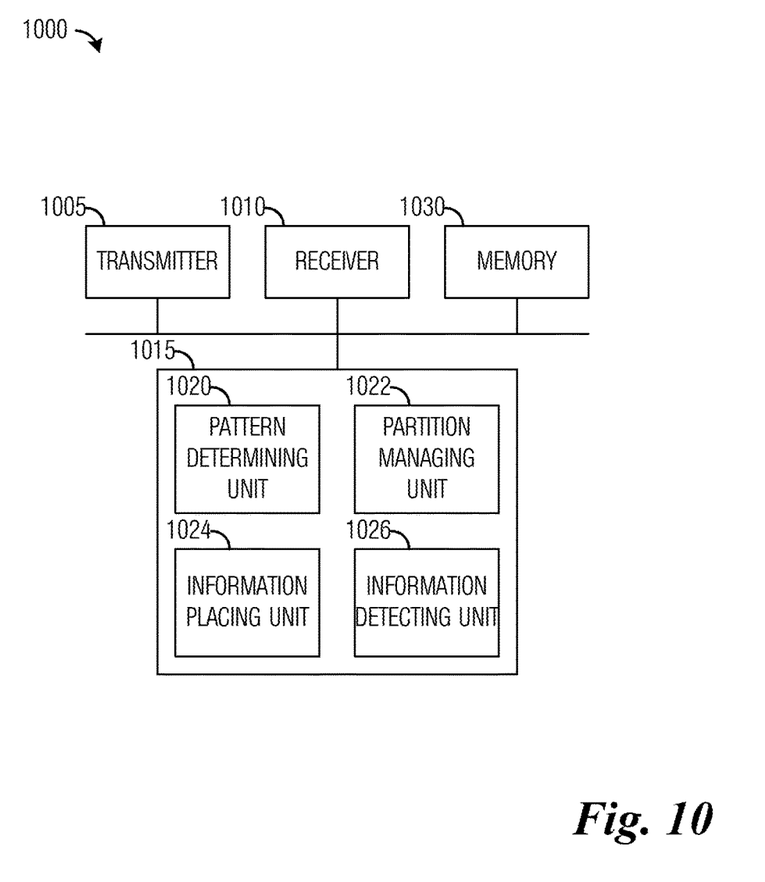
FIG. 10 illustrates an example communications device according to example embodiments described herein.

FIG. 10 illustrates an example communications device 1000. Communications device 1000 may be an implementation of a transmitting device, such as an eNB in a downlink transmission or a UE in an uplink transmission, or a receiving device, such as an eNB in an uplink transmission or a UE in a downlink transmission. Communications device 1000 may be used to implement various ones of the embodiments discussed herein. As shown in FIG. 10, a transmitter 1005 is configured to transmit packets, OFDM symbols, and the like. Communications device 1000 also includes a receiver 1010 that is configured to receive packets, OFDM symbols, and the like.

A pattern determining unit 1020 is configured to determine a spreading pattern, e.g., a SCMA codebook or LDS spreading signature, for a transmitting device or of a transmitting device. A partition managing unit 1022 is configured to determine a number of partitions M, as well as generate a blocks configuration for the bandwidth of an OFDM symbol according to the number of partitions M. An information placing unit 1024 is configured to place pilot signals and/or data in an OFDM symbol in accordance with a spreading pattern of a transmitting device and a blocks configuration. An information detecting unit 1026 is configured to detect pilot signals and/or data from a transmitting device in accordance with the spreading pattern of the spreading device and the blocks configuration of the OFDM symbol. A memory 1030 is configured to store spreading patterns, blocks configuration, number of partitions M, and the like.

The elements of communications device 1000 may be implemented as specific hardware logic blocks. In an alternative, the elements of communications device 1000 may be implemented as software executing in a processor, controller, application specific integrated circuit, or so on. In yet another alternative, the elements of communications device 1000 may be implemented as a combination of software and/or hardware.

As an example, receiver 1010 and transmitter 1005 may be implemented as a specific hardware block, while pattern determining unit 1020, partition managing unit 1022, information placing unit 1024, and information detecting unit 1026 may be software modules executing in a microprocessor (such as processor 1015) or a custom circuit or a custom compiled logic array of a field programmable logic array. Pattern determining unit 1020, partition managing unit 1022, information placing unit 1024, and information detecting unit 1026 may be modules stored in memory 1030.

Although the present disclosure and its advantages have been described in detail, it should be understood that various changes, substitutions and alterations can be made herein without departing from the spirit and scope of the disclosure as defined by the appended claims.

What is claimed is:

1. A method for operating a transmitting device, the method comprising:
    transmitting, by the transmitting device, a pilot signal associated with the transmitting device in a plurality of tones of a first transmission symbol in accordance with a spreading pattern in frequency domain associated with the transmitting device, without transmitting the pilot signal in a remainder of the tones in the first transmission symbol; and
    transmitting, by the transmitting device, data to a receiving device in the plurality of tones of a second transmission symbol in accordance with the spreading pattern in the frequency domain, without transmitting the data or the pilot signal in a remainder of the tones in the second transmission symbol.

2. The method of claim 1, further comprising:
    determining a diversity factor M for the transmitting device, where M is an integer value greater than or equal to 1;
    partitioning a frequency range of the second transmission symbol into M blocks; and
        placing the data into resources of each of the M blocks of the second transmission symbol in accordance with the spreading pattern.

3. The method of claim 1, further comprising:
    determining a diversity factor M for the transmitting device, where M is an integer value greater than or equal to 1;
    partitioning a frequency range of the first transmission symbol into M blocks; and
    placing the pilot signal associated with the transmitting device into resources of each of the M blocks of the first transmission symbol in accordance with the spreading pattern.

4. The method of claim 1, wherein the spreading pattern comprises one of a sparse code multiple access (SCMA) sparse code and a low density signature (LDS) sparse signature.

5. The method of claim 1, wherein the first transmission symbol comprises an orthogonal frequency division multiplexing (OFDM) symbol.

6. The method of claim 1, wherein the transmitting device is a UE and the receiving device is an eNB.

7. The method of claim 1, wherein at least a portion of the remainder of the tones in the first transmission symbol and at least a portion of the remainder of the tones in the second transmission symbol overlap in a frequency range such that neither the pilot signal nor the data is transmitted in the overlapped frequency range.

8. A method for operating a receiving device, the method comprising:
    receiving, by the receiving device, a first transmission symbol from a transmitting device;
    detecting, by the receiving device, a pilot signal associated with the transmitting device in a plurality of tones of the first transmission symbol in accordance with a spreading pattern in frequency domain associated with the transmitting device, without the pilot signal associated with the transmitting device being in a remainder of the tones in the first transmission symbol;
    receiving, by the receiving device a second transmission symbol from the transmitting device; and
    detecting, by the receiving device, data transmitted by the transmitting device in the plurality of tones of the second transmission symbol in accordance with the spreading pattern in the frequency domain, without the data or the pilot signal transmitted by the transmitting device being in a remainder of the tones in the second transmission symbol.

9. The method of claim 8, further comprising:
    determining a diversity factor M for the transmitting device, where M is an integer value greater than or equal to 1; and
    partitioning a frequency range of the second transmission symbol into M blocks, and
    wherein detecting the data comprises detecting the data transmitted by the transmitting device in resources of each of the M blocks of the second transmission symbol in accordance with the spreading pattern.

10. The method of claim 8, further comprising:
    determining a diversity factor M for the transmitting device, where M is an integer value greater than or equal to 1; and partitioning a frequency range of the first transmission symbol into M blocks, and wherein detecting the pilot signal comprises detecting the pilot signal associated with the transmitting device in resources of each of the M blocks of the first transmission symbol in accordance with the spreading pattern.

11. The method of claim 8, wherein the spreading pattern comprises one of a sparse code multiple access (SCMA) sparse code and a low density signature (LDS) sparse signature.

12. The method of claim 8, wherein the first transmission symbol comprises an orthogonal frequency division multiplexed (OFDM) symbol.

13. The method of claim 8, wherein the receiving device is an eNB and the transmitting device is a UE.

14. A transmitting device comprising:
a processor configured to:
place a pilot signal associated with the transmitting device in a plurality of toners of a first transmission symbol in accordance with a spreading pattern in frequency domain associated with the transmitting device, without placing the pilot signal in a remainder of the tones in the first transmission symbol, and
place data in the plurality of tones of a second transmission symbol in accordance with the spreading pattern in the frequency domain, without placing the data or the pilot signal in a remainder of the tones in the second transmission symbol; and
a transmitter operatively coupled to the processor, the transmitter configured to transmit the first and second transmission symbols to a receiving device.

15. The transmitting device of claim 14, wherein the processor is configured to:
determine a diversity factor M for the transmitting device, where M is an integer value greater than or equal to 1, to partition a frequency range of the second transmission symbol into M blocks, and
place the data comprises placing the data into resources of each of the M blocks of the second transmission symbol in accordance with the spreading pattern.

16. The transmitting device of claim 14, wherein the processor is configured to:
determine a diversity factor M for the transmitting device, where M is an integer value greater than or equal to 1, to partition a frequency range of the first transmission symbol into M blocks, and place the pilot signal associated with the transmitting device into resources of each of the M blocks of the first transmission symbol in accordance with the spreading pattern.

17. A receiving device comprising:
a receiver configured to receive first and second transmission symbols from a transmitting device; and
a processor operatively coupled to the receiver and configured to:
detect a pilot signal associated with a transmitting device in a plurality of tones of the first transmission symbol in accordance with a spreading pattern in frequency domain associated with the transmitting device, without the pilot signal associated with the transmitting device being in a remainder of the tones in the first transmission symbol, and
detect data transmitted by the transmitting device in the plurality of tones of the second transmission symbol in accordance with the spreading pattern in the frequency domain, without the data or the pilot signal transmitted by the transmitting device being in a remainder of the tones in the second transmission symbol.

18. The receiving device of claim 17, wherein the processor is configured to:
determine a diversity factor M for the transmitting device, where M is an integer value greater than or equal to 1, to partition a frequency range of the second transmission symbol into M blocks, and
detect the data transmitted by the transmitting device in resources of each of the M blocks of the second transmission symbol in accordance with the spreading pattern.

19. The receiving device of claim 17, wherein the processor is configured to:
determine a diversity factor M for the transmitting device, where M is an integer value greater than or equal to 1, to partition a frequency range of the first transmission symbol into M blocks, and
detect the pilot signal associated with the transmitting device in resources of each of the M blocks of the first transmission symbol in accordance with the spreading pattern.

* * * * *